United States Patent [19]

Spinks

[11] Patent Number: 5,217,682
[45] Date of Patent: Jun. 8, 1993

[54] PASSIVE INDIRECT SHUTDOWN COOLING SYSTEM FOR NUCLEAR REACTORS

[75] Inventor: Norman J. Spinks, Deep River, Canada

[73] Assignee: Atomic Energy of Canada Limited, Ottawa, Canada

[21] Appl. No.: 701,713

[22] Filed: May 17, 1991

[51] Int. Cl.⁵ .............................................. G21C 9/00
[52] U.S. Cl. ................................... 376/298; 376/282; 376/299
[58] Field of Search ............... 376/298, 299, 403, 287, 376/371, 282

[56] References Cited

U.S. PATENT DOCUMENTS

| | | | |
|---|---|---|---|
| 3,285,824 | 11/1966 | Ageron | 376/403 |
| 3,308,032 | 4/1964 | Berthod | 376/282 |
| 4,187,147 | 2/1980 | Braun et al. | 376/282 |
| 4,236,968 | 12/1980 | Werker et al. | 376/299 |
| 4,407,772 | 10/1983 | Woudstra | 376/299 |
| 4,689,194 | 8/1987 | Wachholz et al. | 376/299 |
| 4,716,014 | 12/1987 | Cantineau | 376/371 |
| 4,753,771 | 6/1988 | Conway et al. | 376/299 |
| 4,818,475 | 4/1989 | Gluntz et al. | 376/282 |
| 4,830,815 | 5/1989 | Gluntz | 376/299 |

FOREIGN PATENT DOCUMENTS 618733 4/1961 Canada .

OTHER PUBLICATIONS

"Next Generation Nuclear Reactors: Dare We Build Them?" Arthur Fisher; *Popular Science;* Apr. 1990, p. 68.

*Primary Examiner*—Brooks H. Hunt
*Assistant Examiner*—Frederick H. Voss
*Attorney, Agent, or Firm*—Gowling, Strathy & Henderson

[57] ABSTRACT

A nuclear reactor system including a main heat transport path around which a first coolant is pumped by main circulation pumps to transport heat from the reactor core to a steam generator. A heat exchanger is located in the main heat transport path after the outlet from the steam generator, the secondary side of that heat exchanger being in a decay heat removal loop which contains a second liquid coolant. A vapor separator in the decay heat removal loop is connected to an outlet of the heat exchanger with the vapor separator's outlet being connected to an inlet of a further heat exchanger located in a large tank of water which forms a heat sink. The further heat exchanger's outlet is connected to the heat exchanger's inlet forming a closed loop. The further heat exchanger is located at a higher elevation than the heat exchanger whereby a natural convection flow can occur in the decay heat removal path. Normally, the vapor/liquid interface in the loop is at a higher elevation than the heat sink which prevents any significant natural convection flow until boiling of the second liquid coolant occurs in the heat exchanger. If the steam generator is lost as a heat sink, this causes boiling of the secondary coolant to occur in the heat exchanger starting a natural convection flow in the decay heat removal loop. This natural convection starts automatically without the need of any valves being opened or any other type of intervention.

6 Claims, 2 Drawing Sheets ated by the main coolant pump through the reactor core to the main heat removal component and back to the reactor core to transport heat generated in the reactor core to the main heat removal components;

PASSIVE INDIRECT SHUTDOWN COOLING SYSTEM FOR NUCLEAR REACTORS

FIELD OF THE INVENTION

The invention relates to a nuclear reactor having a primary cooling circuit with a primary heat sink for removing heat generated in the reactor core during normal operation and an additional means for dissipating decay heat which is produced in the core of the reactor after the reactor has been shutdown. The means for removal of decay heat from the reactor core is one that is automatically activated as soon as the primary heat sink becomes unavailable as a heat sink.

BACKGROUND OF THE INVENTION

An emergency or normal shutdown of any nuclear power reactor system requires a system to remove decay heat which is produced in the reactor core after shutdown and thereby prevent damage to the reactor and associated systems. The system for removal of decay heat from the reactor core must be one which can remain operational for a lengthy period of time. In power generating nuclear reactor systems, such as a CANDU reactor, a steam generator is present in the primary cooling circuit which acts as a heat sink during normal operation. However, if the steam generator becomes unavailable as a heat sink and the reactor is shutdown, another means must be present to dissipate decay heat which continues to be produced in the reactor core.

U.S. Pat. No. 4,689,194 shows one type of decay heat removal system for a gas cooled reactor. Circulating blowers cause a cooling gas (helium) to flow up through the reactor core and a central hot gas line downward through steam generators and decay heat exchangers back to the blowers. If the circulating blowers are not operational, decay heat from the core is removed by a natural convection flow of the cooling gas in the same direction as the flow during normal operation of the reactor. The decay heat exchangers are each connected with an external re-cooling heat exchanger at a geodetically higher location by means of two legs which form a water circulation loop. If the steam generators are no longer available for the removal of heat from the primary cooling path, they are traversed by hot gas which subsequently passes through the decay heat exchanges. This causes a rise in temperature at the inlet of the decay heat exchangers which leads to evaporation taking place in the water circulation loops whereby natural convection flow in these loops is enhanced and a sufficient amount of heat is removed from the primary cooling path through the decay heat exchangers.

U.S. Pat. No. 4,830,815 shows other types of shutdown cooling systems for pressurized boiling water reactors which include a separate shutdown cooling heat exchanger in a cooling pond. Valves are including in the piping to those heat exchangers and additional pumps are used to pump coolant from the reactor to the shutdown cooling heat exchanger and back to the reactor. These types of systems require valves to be opened and pumps activated before they are operational.

SUMMARY OF THE INVENTION

It is an object of the invention to provide an improved decay heat removal system for a nuclear reactor which is automatically activated when the main heat removal component for the reactor system becomes inoperational and which causes very little heat to be lost from the reactor system during normal operation of the reactor.

A nuclear reactor system, according to a preferred embodiment of the invention, consists of a reactor core and a main heat transport path containing a main heat removal component, at least one main coolant pump and a first coolant wherein, during normal operation, the first coolant is pumped by the main coolant pump through the reactor core to the main heat removal component and back to the reactor core to transport heat generated in the reactor core to the main heat removal components;

the main heat transport path including a heat exchanger located in the path after the main heat removal component's outlet with the secondary side of the heat exchanger being included in a decay heat removal loop having a vapor separator connected to an outlet of the heat exchanger, the vapour separator's outlet being connected to an inlet of a further heat exchanger located in a reservoir of coolant which forms a heat sink, the further heat exchanger's outlet being connected to the heat exchanger's inlet;

and wherein the further heat exchanger is located at a higher elevation than the heat exchanger whereby a natural convection flow can occur in the decay heat removal path, the vapor/liquid interface in the vapour separator being at a higher elevation than the heat sink which prevents any significant natural convection flow until boiling of the second liquid coolant occurs in the heat exchanger.

DESCRIPTION OF THE PREFERRED EMBODIMENT

Figure 1:
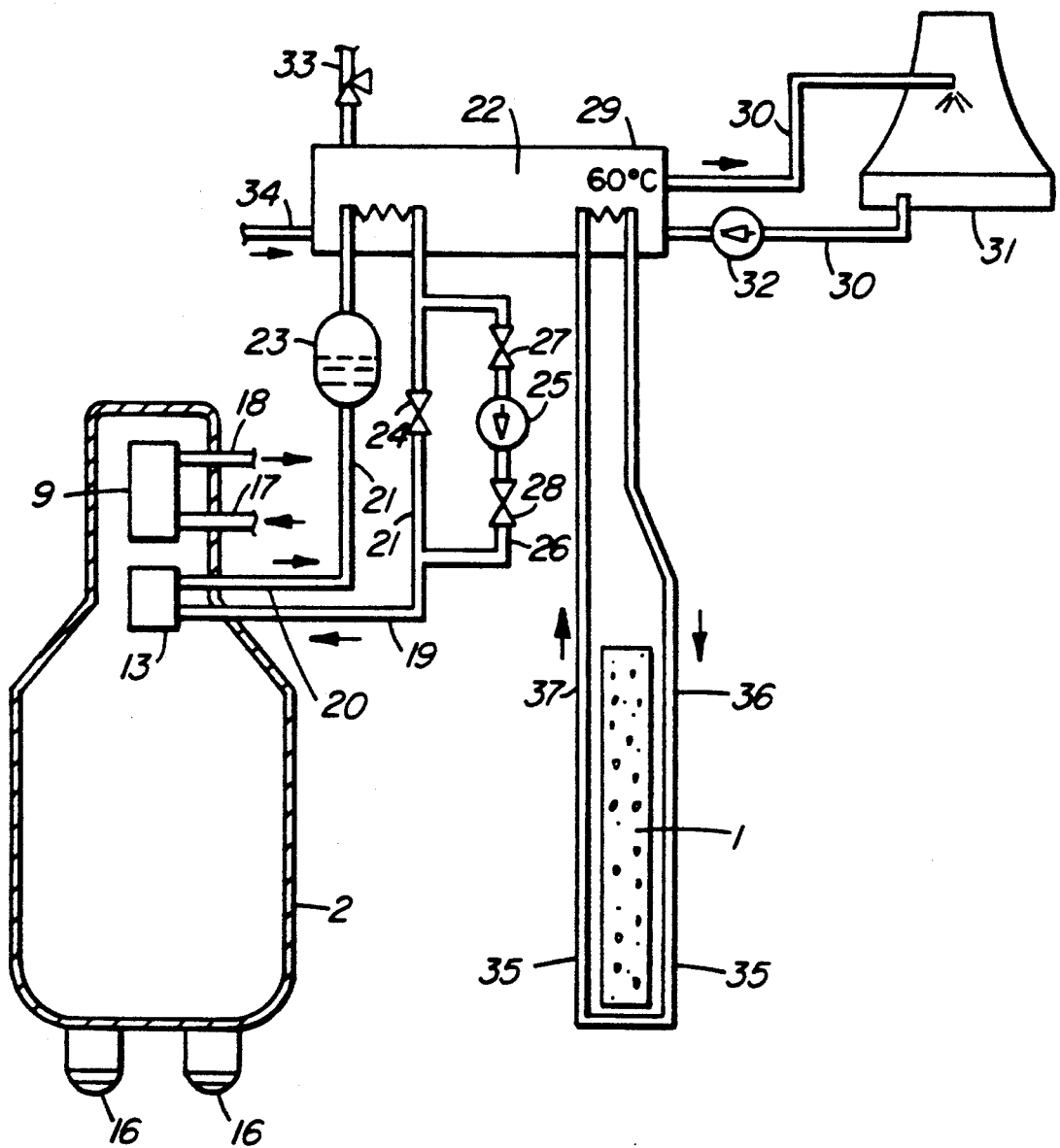
FIG. 1 diagrammatically shows a nuclear reactor system with a recooling system for a decay heat exchanger as described in U.S. Pat. No. 4,689,194.

The nuclear reactor system shown in FIG. 1 and described in U.S. Pat. No. 4,689,194 contains a principle cooling path with a cooling gas (helium) which flows up through a reactor core in the bottom portion of steel pressure vessel 2 and through a central hot gas conduit to the top portion of vessel 2. The heated gas then flows downward through the principal heat exchangers 9, downward through decay heat exchangers 13 to circulating blowers driven by motors 16 which return the gas flow to the lower part of the reactor core. Decay heat, produced after the reactor is shutdown, can be removed by natural convection if the circulating blowers are no longer available to circulate the gas flow.

The principle heat exchanger 9 (only one being shown in FIG. 1) are steam generators with the hot gas from the central conduit flowing through the steam generators 9 from top to bottom whereby the gas temperature is reduced from approximately 700° C. to 250° C. at the outlets of the steam generators. The decay heat exchangers 13 are also traversed by the gas flowing from the top to bottom of the decay heat exchangers after the cooled gas has exited from the outlets of the steam generators 9. The decay heat exchangers 13 are, as a result, exposed to a gas flow at a temperature of about 250° C. during normal operation of the reactor. The decay heat exchangers 13 are connected to an external recooling heat exchanger 22 at a geodetically higher location by two legs 19 and 20 which form a decay heat removal loop 21. A water-steam separator vessel 23 is located in leg 20 between decay heat exchanger 13 and the external recooling heat exchanger 22. The water-steam separator 23 provides for volume equalization in the decay heat removal loop in case of evaporation of the water.

The decay heat exchangers 13 are operated, on the secondary side, with cooling water at a pressure chosen such that the cooling water at the outlets of decay heat exchangers 13 does not evaporate during normal operation i.e. when the decay heat exchangers 13 are subjected to a gas temperature of 250° C. from the outlets of steam generators 9. The decay heat removal loop has a low volume of water and is operated, during normal operation of the reactor, by a natural convection flow with shut-off valves 24 being in the open position.

If the steam generators 9 are no longer available as a heat sink, they are traversed by hot gas at a temperature of about 700° C. which then enters into the decay heat exchangers 13. This raises the temperature of the decay heat exchangers 13 and leads to evaporation of cooling water in the decay heat removal loops 21 which increases the natural convection flow in loops 21 so that the decay heat is safely removed from the gas flow in the reactor.

The increase in natural convection flow in loops 21 when steam generators 9 are not available as heat sinks allows decay heat to be safely removed without incurring a heat loss of the same size during normal operation of the reactor. That increase also happens automatically without the need to actuate any valves, shut-off valve 24 being open during normal operation of the reactor. The decay heat is removed as a result of the rising temperature alone with no additional actuating measures being required. However, with a low water volume in the decay heat removal loops 21, steam will be present in the upper part of hot leg 20 during normal operation of the reactor with water throughout the cold leg 19, the head of water in the cold leg forcing a substantial flow in the loop 21 by natural circulation. This natural circulation flow will result in substantial heat being lost through the decay heat removal loops during normal operation of the reactor. Furthermore, that natural circulation flow can not be restricted during normal operation of the reactor, for instance by an orifice, because it would then be restricted under emergency conditions when it is necessary to safely remove decay heat from the gas flow in the reactor.

Figure 2:
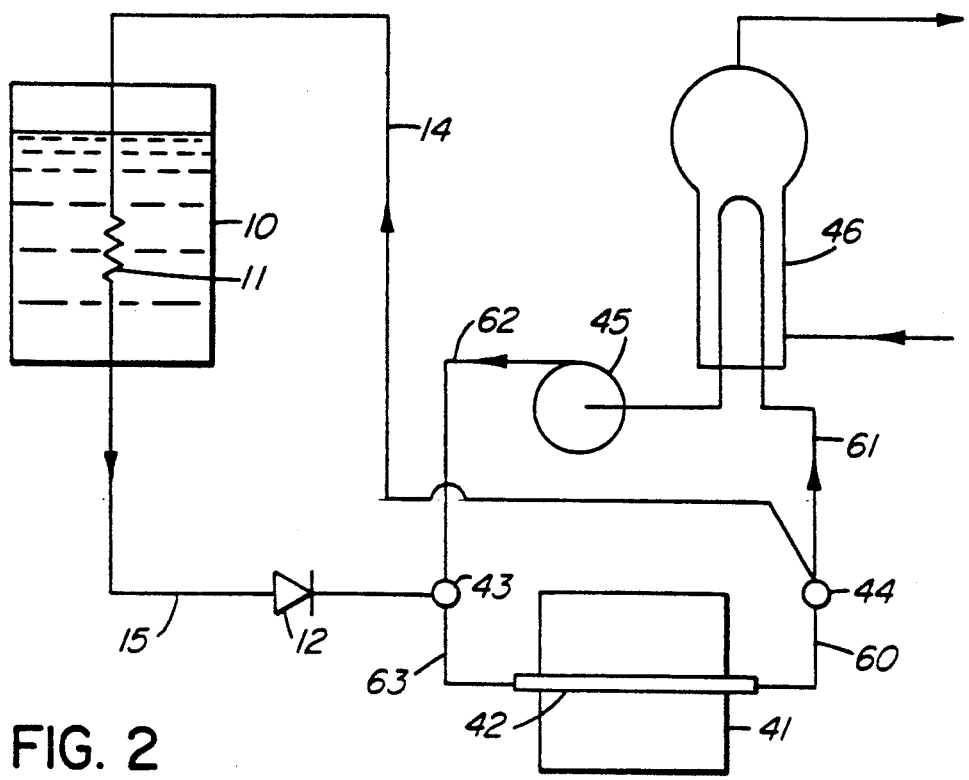
FIG. 2 illustrates a proposed passive shutdown cooling system for a CANDU nuclear reactor.

FIG. 2 shows one proposed system for the removal of decay heat from a CANDU nuclear reactor. The core 41 of a CANDU nuclear reactor has a number of fuel channels 42 extending through the core with cooling water flowing from inlet header 43 via pipes 63 through the channels 42 and via pipes 60 to an outlet header 44. The normal flow of cooling water during normal operation of the reactor is from high temperature outlet header 44 via pipe 61 through a steam generator 46 to a main circulation pump 45 which pumps the cooling water via pipe 62 to low temperature inlet header 43 and back to the reactor core via pipes 63. In this type of system, the main pump 45 will be shutdown when the steam generator 46 is unavailable as a heat sink which may be caused by an accident or when the steam generator is out of service for repairs.

The decay heat removal path consists of pipe 14 extending from high temperature outlet header 44 to an inlet of a heat exchanger 11 in a large reservoir 10 of water which forms a heat sink. The tank 10 of water is sufficient large and holds a sufficient volume of water to provide a heat sink for several days. The outlet of heat exchanger 11 is connected to pipe 15 and through a check valve 12 to a low temperature inlet header 43. The check valve 12 opposes the main pump head when the main pump 45 is operating to prevent backflow through pipe 15, heat exchanger 11 and pipe 14 during normal operation. The heat exchanger 11 is located at a higher elevation than the reactor headers 44 and 43 so that a natural convection flow can occur from high temperature header 44 to low temperature header 43 when pump 45 is stopped.

In this type of system, when the main pumps are tripped, coolant from high temperature header 44 can start a natural convection circulation flow up pipe 14 down through heat exchange 11 and via pipe 15 through check valve 12 to low temperature header 43. This natural convection flow through the decay heat removal path is of a sufficient size to remove heat generated in the reactor core when the reactor is shutdown. However, in a CANDU reactor, the header to header pressure drop is close to zero and can even be in the wrong direction which creates problems in getting that natural convection circulating flow started. This type of system also requires a large volume of heavy water to be present in the decay heat removal path which adds to the cost of the reactor system.

Figure 3:
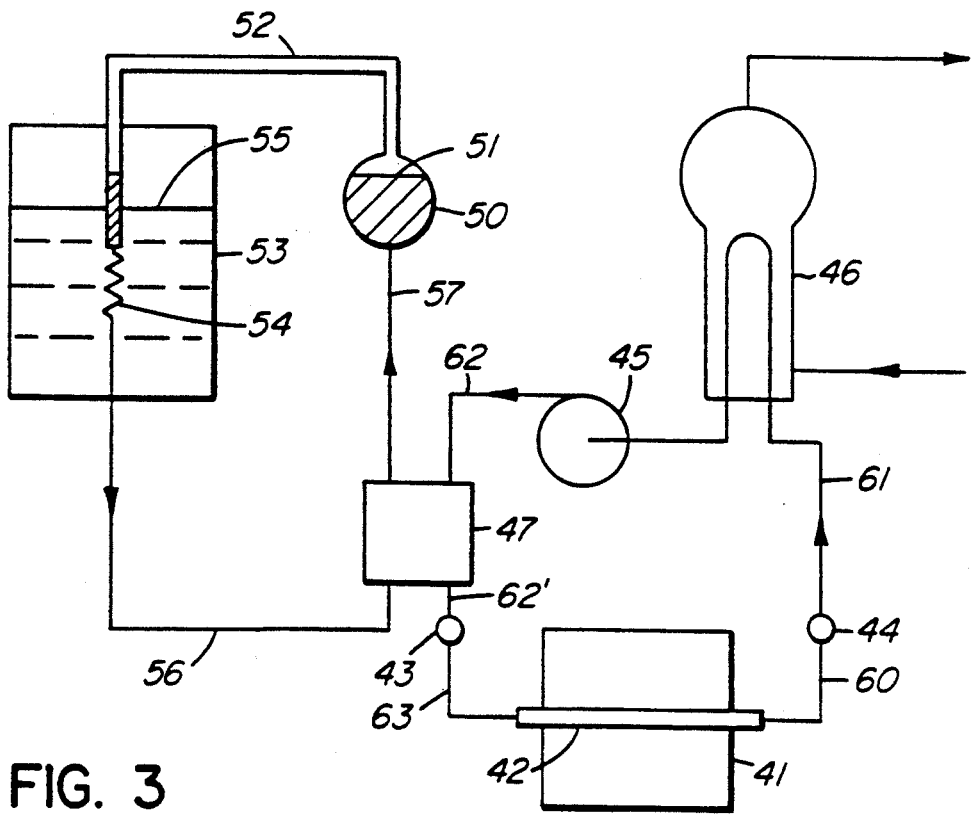
FIG. 3 shows a passive shutdown cooling system according to the present invention.

FIG. 3 shows an alternative system, according to the present invention, for removal of decay heat generated in the reactor core after a steam generator is lost as a heat sink. This system substantially avoids problems associated with the previously described systems. The normal flow of cooling water in FIG. 3 is the same as in FIG. 2, i.e. from the outlet header 44 via pipe 61 through steam generator 46 to a main circulation pump 45 and via pipe 62 (62') to inlet header 43. However, a heat exchanger 47 is now located between circulating pump 45 and low temperature header 43. The outlet of the secondary side of heat exchanger 47 is connected via pipe 57 to an inlet of a vapor separator 50 whose outlet is connected via pipe 52 to another heat exchanger 54 in a large reservoir 53 of water which forms a heat sink. The reservoir 53 of water is large enough to provide a heat sink for several days. The outlet of heat exchanger 54 is connected via pipe 56 to an inlet of heat exchanger 47 forming a decay heat removal loop which contains a fluid such as normal water rather than heavy water. This provides a substantial reduction in costs compared to the type of system shown in FIG. 2. A fairly large mass of fluid is located in the decay heat removal loop.

Heat exchanger 54 is located at a higher elevation than heat exchanger 47 so that a natural circulation flow can occur from the outlet of heat exchanger 47 through the vapor separator 50 and heat exchanger 54 to the inlet of heat exchanger 47. However, during normal operation of the reactor, the natural convection flow is essentially zero because the decay heat removal loop is pressurized to prevent boiling of the liquid on the secondary side of heat exchanger 47. Also the loop is partially filled to keep the vapor/liquid interface 51 above the level 55 of coolant in the heat sink 53. During normal operation, substantial temperature differences exist around the decay heat removal loop i.e. from hot to cold at the vapor/liquid interface near the inlet to the heat sink 53 and from cold to hot at the inlet to the heat exchanger 47. Heat transfer would occur because of these temperature differences but would be insignificant because of the small heat transfer area. The normal heat losses would be small because the temperature differences within the heat exchanger 47 and within the heat exchanger 54 at heat sink 53 would be small.

If the steam generator 46 is lost as a heat sink, the coolant temperature at the outlet on the primary side of steam generator 46 increases which raises the temperature of the heavy water coolant entering the heat exchanger 47. This raises the temperature of the secondary liquid in heat exchanger 47 towards boiling. Boiling results in a large reduction in back pressure due to voiding of the hot leg which causes a recirculating flow to develop by natural convection with cold water entering heat exchanger 47 and a hot vapor/liquid mixture entering the heat exchanger 54 in heat sink 53. In this system, decay heat removal would automatically switch from the steam generator 46 to the alternate heat sink 53 when the steam generator is lost as a heat sink without the need for valves being opened or any other type of intervention.

The pressure and inventory of water in the decay heat removal loop would be controlled to maintain the required pressure and level in the steam separator 50. The system can then be periodically tested during normal operation by lowering the pressure in the decay heat removal loop and measuring the temperature rise at the entrance to heat exchanger 54. An eventual reactor cooldown to a temperature near 100° C. can be effected by also reducing the pressure in the decay heat removal loop. If it is required to lower the reactor temperature below 100° C., a liquid with a lower boiling point than water can be used in the decay heat removal loop.

Various modifications may be made to the preferred embodiments without departing from the spirit and scope of the invention as defined in the appended claims. For instance, although the preferred embodiments have been described with respect to a CANDU reactor, similar systems may be used in various other types of nuclear reactor.

The embodiments of the invention in which an exclusive right or priviledge is claimed are defined as follows:

1. A nuclear reactor system comprising:
   a reactor core and a main heat transport path containing a main heat removal component;
   at least one main coolant pump and a first coolant wherein, during normal operation, the first coolant is pumped by the main coolant pump through the reactor core to the main heat removal component and back to the reactor core to transport heat generated in the reactor core to the main heat removal component;
   the main heat transport path including a heat exchanger located in that path after the main heat removal component's outlet with the secondary side of the heat exchanger being included in a decay heat removal loop containing a second liquid coolant and having a vapor separator connected to an outlet of the secondary side of the heat exchanger;
   the separator's outlet being connected to an inlet of a further heat exchanger located in a reservoir containing a third liquid coolant which forms a heat sink;
   the further heat exchanger's outlet being connected to an inlet to the secondary side of the heat exchanger; and
   wherein the further heat exchanger is located at a higher elevation than the heat exchanger whereby a natural convection flow can occur in the decay heat removal path, the vapor/liquid interface in the loop normally being at a higher elevation than the heat sink which restricts any natural convection flow until boiling of the second liquid coolant occurs in the heat exchanger.

2. A nuclear reactor system as defined in claim 1, wherein the second liquid coolant is water.

3. A nuclear reactor system as defined in claim 2, wherein the first coolant is heavy water.

4. A nuclear reactor system as defined in claim 3, wherein the primary heat removal component is a steam generator.

5. A nuclear reactor system as defined in claim 4, wherein the steam generator's input is connected to a higher temperature outlet header for the reactor and an outlet of the heat exchanger is connected to a low temperature inlet header for the reactor.

6. A nuclear reactor system as defined in claim 2, wherein the decay heat removal path is pressurized.

* * * * *